Feb. 22, 1938. W. S. HARLEY 2,109,315
RADIO CARRYING ATTACHMENT FOR BICYCLES AND MOTORCYCLES
Filed April 30, 1936 2 Sheets-Sheet 2
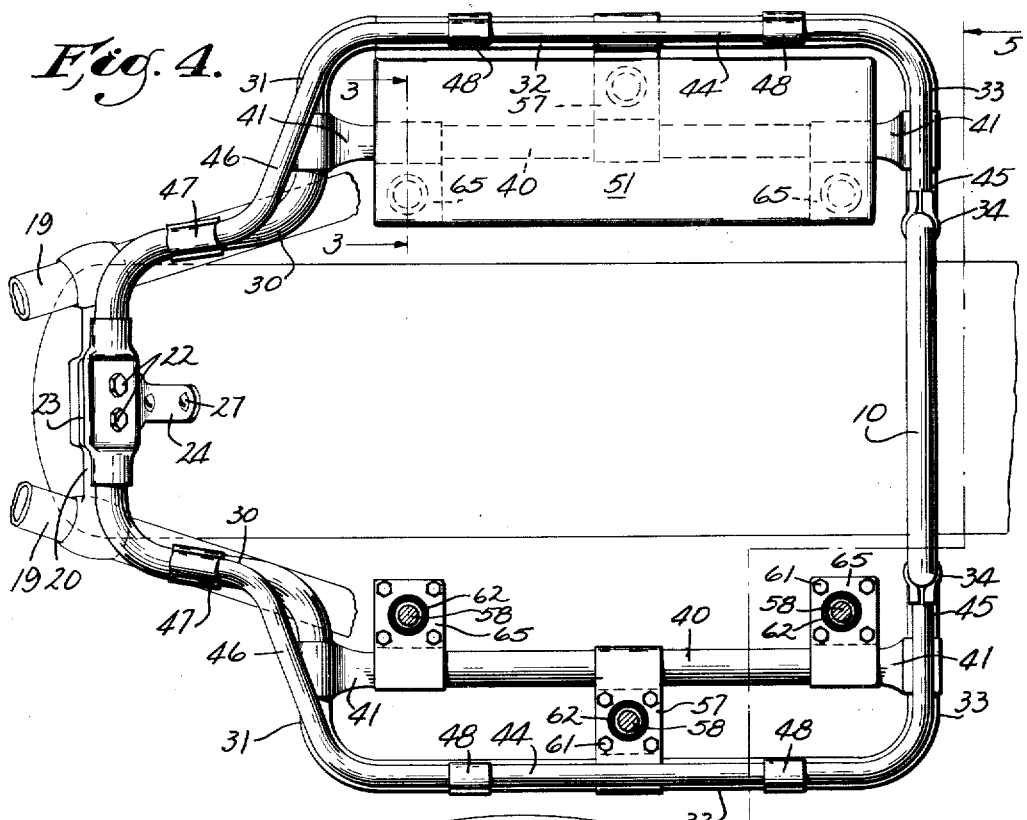
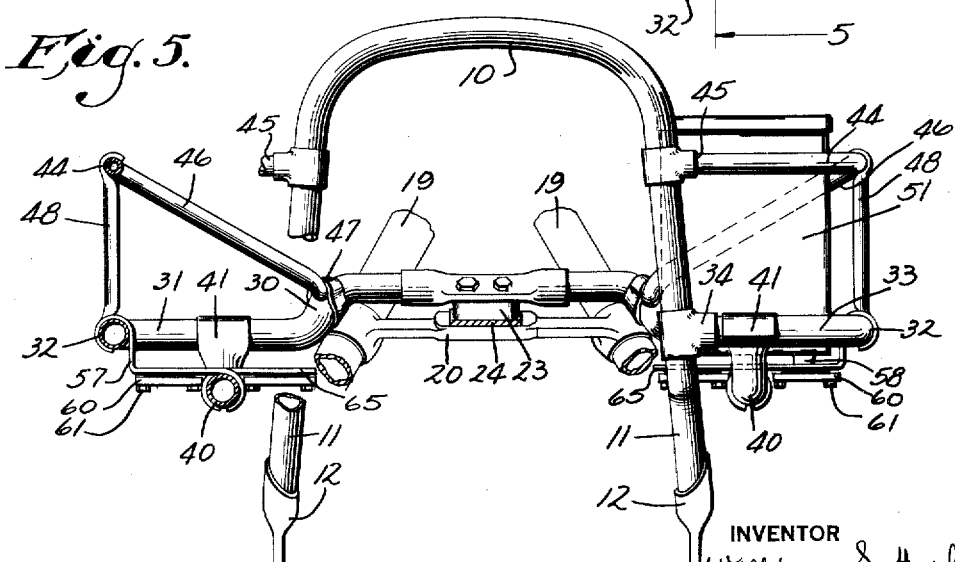
INVENTOR
William S. Harley
BY
Wheeler, Wheeler & Wheeler
ATTORNEYS Patented Feb. 22, 1938

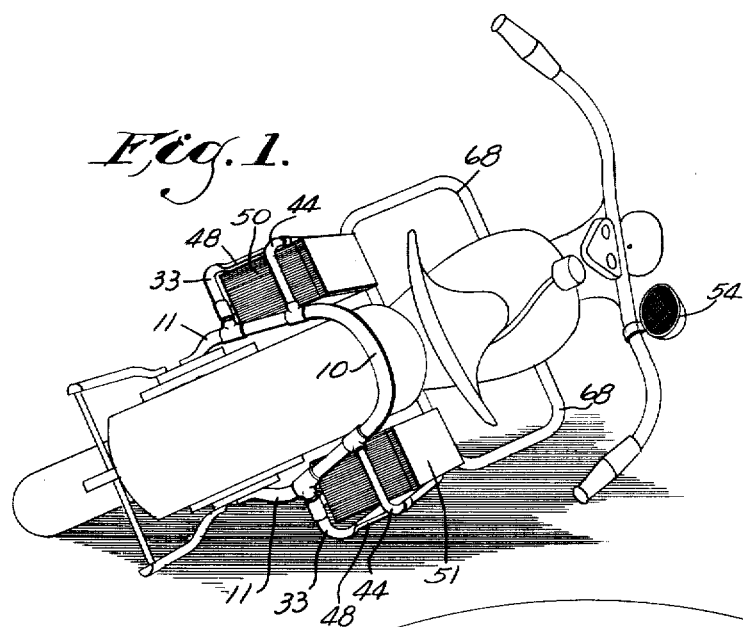
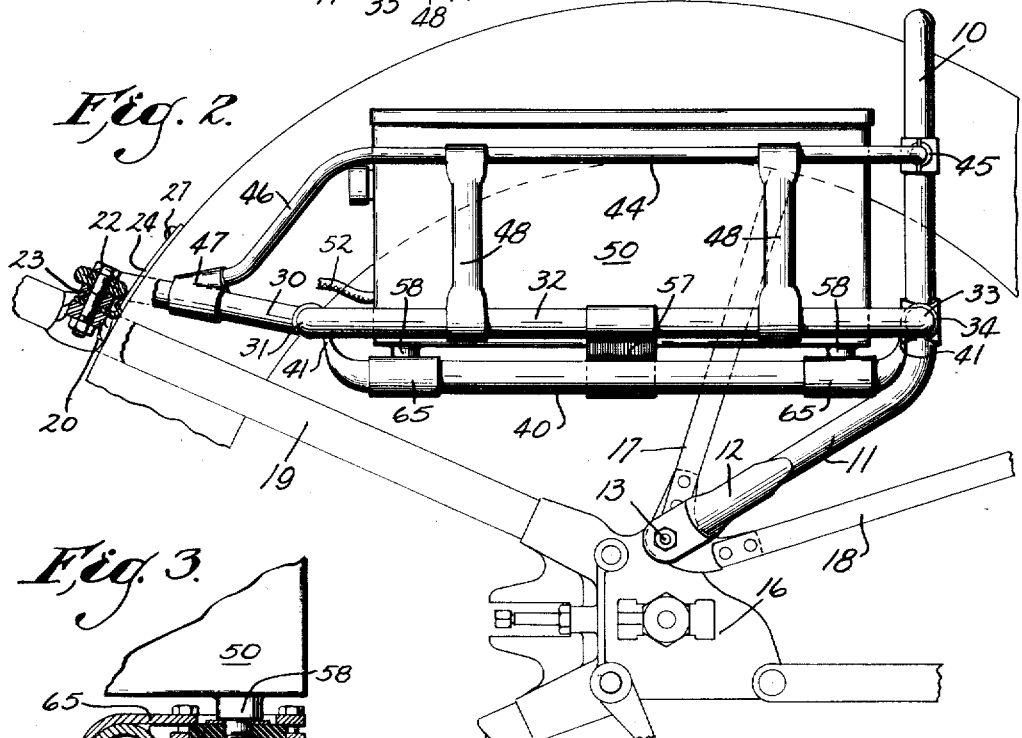
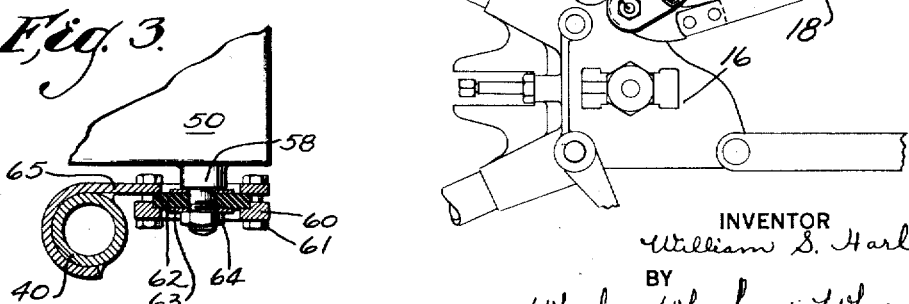

2,109,315

UNITED STATES PATENT OFFICE 2,109,315

RADIO CARRYING ATTACHMENT FOR BICYCLES AND MOTORCYCLES

William S. Harley, Milwaukee, Wis., assignor to Harley-Davidson Motor Co., Milwaukee, Wis., a corporation of Wisconsin Application April 30, 1936, Serial No. 77,160

2 Claims. (Cl. 224—32)

My invention relates to carrying attachments for bicycles and motorcycles, with particular reference to attachments for supporting radio sets.

My objects are to provide improved means whereby radio sets with their batteries or battery eliminators may be mounted in balanced relation to the rear wheels of such vehicles with a minimum shifting of the center of gravity and with minimum interference with the movements of the riders, especially when mounting or dismounting, and minimum imposition of additional strains upon the frame.

A very important object is to provide motorcycles with radio equipment designed for police service and other duty calling for speeds of from 70 to 100 miles per hour, and in which this added equipment will result in little loss of stability at such speeds.

A further object is to provide a mounting for supporting radio sets and other articles which will reenforce the rear portion of the vehicle frame and cooperate with other portions of the vehicle is preventing injuries to the rider or damage to the vehicle during collisions or up-sets.

A further object is to provide means for adequately protecting the radio equipment or other articles from damage when the vehicle is dropped or thrown upon its side, or otherwise subjected to abnormal shocks.

The improvement herein disclosed is also designed for cooperation with protective guards similar to those disclosed in my former Patent No. 1,941,801, dated January 2, 1934, whereby the vehicle may be still more adequately protected when sliding on its side.

In the drawings:

Figure 1 is a perspective view of a motorcycle equipped with my invention as it appears in a fallen position.

Figure 2 is a side elevation of an attachment embodying my invention, showing in light lines fragments of the fender, frame and wheel.

Figure 3 is a detail sectional view drawn to line 3—3 of Figure 4.

Figure 4 is a plan view of an attachment embodying my invention, with one of the containers removed,—fragments of the rear fork and fender being also illustrated in light lines.

Figure 5 is a rear elevation, partly in section, drawn generally to line 5—5 of Figure 4.

Like parts are identified by the same reference characters throughout the several views.

An arched frame rod or yoke 10 straddles the rear wheel and mud guard back of a vertical plane through the axle, and has forwardly inclined lower end portions 11 provided with connecting members 12. These connecting members 12 have flattened extremities apertured to receive a bolt 13, whereby the lower ends of this arched rod or yoke may be secured to the axle clips or plates 16. The same bolts 13 may also serve to connect the mud guard supporting braces 17 and 18 to the clips 16 at the respective sides of the wheel.

The yoke 10 forms the rear end of a carrier which includes main horizontal carrier rods connecting the respective ends of the yoke 10 with the cross brace 20 of the motorcycle frame, such as is commonly employed to connect the upper stays 19 in front of the rear wheel. These main side rods of the carrier are preferably formed from a single piece of tubing, having its central portion bent in the form of a loop and flattened to facilitate connecting it with the cross brace 20, by means of bolts 22. A spacing block or plate 23 and a mud guard supporting plate 24 may be interposed between the flattened portion of the tube and the cross brace 20, and the mud guard support 24 may be extended upwardly and secured to the mud guard as indicated at 27.

From the flattened central portion this tube is extended rearwardly along each side of the wheel, with a slight downward inclination in the portions 30, a lateral inclination in the portions 31, and horizontally in the portions 32, the rear end portions being inwardly turned at 33 and secured to the legs of the arch or yoke 10 at 34.

At each side of the wheel the portions 31 and 33 of the main horizontal frame bar are connected by a bar 40 which is generally parallel with the frame bar portion 32, but preferably suspended at a lower level by hook-shaped end portions 41 which may be brazed or otherwise secured to the frame bar portions 31 and 33, respectively.

A superposed carrier bar 44 has one end connected to the yoke 10 at 45 and the other end portion inclined downwardly, forwardly, and inwardly at 46 and connected with the main horizontal carrier bar at 47. The major portion of the bar 44 is directly above the portion 32 of the main carrier bar and may be connected therewith at intervals by suitable posts or links 48.

The yoke 10, main carrier bar portions 32, superposed bars 44, and the suspended bars 40 form a frame or cage which embraces the upper portion of the rear wheel.

In the embodiment of my invention illustrated in the drawings, a box 50, suitable for enclosing a radio set, (either a receiving or transmitting set), is mounted in the above described cage, preferably at the left hand side of the rear wheel, and a similar box 51 is mounted in the cage at the other side of the rear wheel, for reception of a B battery, or a vibrator type converter, connected to the radio set by a waterproof cable 52. A converter is preferably employed as it enables the motorcycle storage battery to be utilized as a source of all power required for operation of the radio. The speaker 54 will preferably be secured to the handle bar and is made highly directional to enable the rider to receive the signals with minimum reception by others. Inasmuch as the radio equipment conforms generally to standard practice, further description and illustration is deemed unnecessary, and in general, the wiring is omitted from the drawings to avoid confusing the illustration.

Cushioned mountings are provided for the boxes 50 and 51. The mounting bracket 57 connects the frame bars 32 and 40 and is apertured to receive a clamping bolt 58 depending from the bottom of the box 50. A clamping plate 60 is secured to the bracket by bolts 61 and a rubber cushion 62 is interposed. The clamping bolt passes through this rubber cushion, to which it is secured by means of the washer 63 and a clamping nut 64. The boxes 50 and 51 are similarly secured to inwardly projecting brackets 65, brazed or otherwise secured to the respective end portions of the rod 40, whereby each of the boxes is provided with a three-point cushioned support or mounting.

The frame bars are perfectly formed of heat treated steel tubing. The mountings for the boxes are so located that the center of gravity is entirely below the seat level. The installation is therefore inconspicuous, and the weight is so located and distributed that the center of gravity of the motorcycle as a whole is not objectionably raised, i. e., it is not raised sufficiently to materially affect the stability of the motorcycle when in normal motion. The boxes 50 and 51 are equipped with covers and made water-proof.

Also, by using tubing of sufficient strength to resist the shock of an upset which brings the frame rods of the attachment into contact with the ground, said frame rods, and particularly the portions 32 of the main horizontal frame rod, may serve as runners or shoes to support and protect the radio equipment, as well as the motorcycle and the rider, from contact with the ground, whereby, if the motorcycle is upset while in motion, it may travel along the surface of the roadway for a considerable distance until its inertia is overcome, with the motorcycle supported substantially in the position in which it is illustrated in Figure 1. If the motorcycle is also equipped with shin guards 68 similar to those disclosed in my former patent above referred to, the handle bar, the shin guard 68, and the supporting frame for the radio equipment afford substantially complete protection to prevent injury to motorcycle, rider, and the radio equipment.

I attach considerable importance to the combination of the auxiliary frame here disclosed, with the shin guard 68 for mutual cooperation in preventing contact of destructible parts with the ground when the vehicle is upset while in motion. For convenience in description, the shin guard 68 may be referred to as a front runner shoe and the frame member 32 as a rear runner shoe, operative for protective purposes, either with or without association with the other members of the auxiliary frame. However, it will be understood that the auxiliary frame for supporting the radio equipment may also serve as an improved caged shelf support for other articles of approximately equal weight, which are capable of being stored in the auxiliary frame at opposite sides of the wheel.

I claim:

1. A rugged protective and radio carrying attachment for a motorcycle comprising the combination with a motorcycle rear wheel and axle and connected frame stays, of a set of runner shoes having their rear ends connected with each other and also supported from the axle at the respective sides of the wheel, said runner shoes having rear portions extending laterally and side portions extending forwardly along the sides of the wheel above the axle, with convergent front end portions connected to the frame stays, cage members connected with said shoes, and mountings connected with the cage members and positioned to support radio equipment between the shoes and the wheel.

2. A rugged protective and radio carrying attachment for a motorcycle, comprising the combination with a motorcycle rear wheel and frame stays, of an arched auxiliary member extending from the axle clips rearwardly and upwardly over the wheel, a set of runner shoes secured to the sides of said arched member and extending laterally therefrom with intermediate portions extending forwardly along the sides of the wheel above the axle and substantially parallel to the wheel, the front end portions being connected to the frame stays, and radio mountings supported from said shoes at the inner sides thereof and positioned to carry radio battery and receiving sets between the shoes and said wheel, said arched member and runner shoes being adapted to support the upper portions of the wheel of a fallen motorcycle out of contact with the ground and with the contacting shoe axially sliding in the direction of motorcycle travel until its momentum is checked.

WILLIAM S. HARLEY.